United States Patent
Ito

(10) Patent No.: US 11,394,887 B2
(45) Date of Patent: Jul. 19, 2022

(54) IMAGING APPARATUS HAVING VIEWPOINT DETECTION FUNCTION, METHOD OF CONTROLLING IMAGING APPARATUS, AND STORAGE MEDIUM

(71) Applicant: CANON KABUSHIKI KAISHA, Tokyo (JP)

(72) Inventor: Daisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/308,883

(22) Filed: May 5, 2021

(65) Prior Publication Data
US 2021/0360169 A1    Nov. 18, 2021

(30) Foreign Application Priority Data
May 12, 2020  (JP) .............................. JP2020-083750

(51) Int. Cl.
*H04N 5/232*    (2006.01)
(52) U.S. Cl.
CPC ... *H04N 5/232939* (2018.08); *H04N 5/23219* (2013.01); *H04N 5/232411* (2018.08)

(58) Field of Classification Search
CPC ....... H04N 5/232939; H04N 5/232411; H04N 5/23219
See application file for complete search history.

(56) References Cited

U.S. PATENT DOCUMENTS

2021/0176555 A1*  6/2021  Hoffmann ........ G02B 27/0172

FOREIGN PATENT DOCUMENTS

| JP | H08182652 A | 7/1996 |
|----|----|----|
| JP | 2002189464 A | 7/2002 |

* cited by examiner

*Primary Examiner* — Yogesh K Aggarwal
(74) *Attorney, Agent, or Firm* — Canon U.S.A., Inc. IP Division

(57) ABSTRACT

An apparatus includes an imaging unit configured to image an object to generate a captured image, a display control unit configured to display the captured image and additional information superimposed on the captured image on a display unit, a detection unit configured to detect a user viewpoint in the display unit, and a switching unit configured to switch a display state of the displayed captured image to a first state or a second state inferior to the first state, based on a position of the detected user viewpoint.

12 Claims, 5 Drawing Sheets

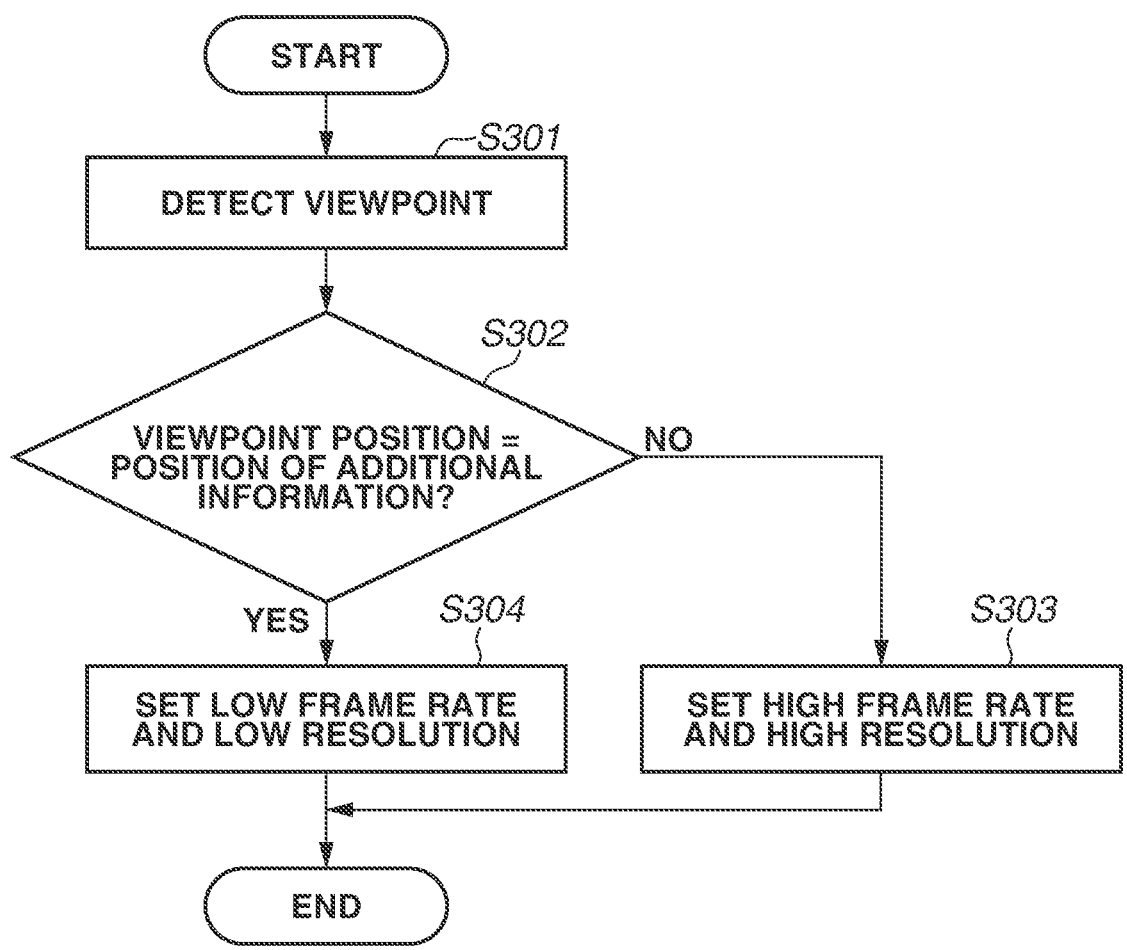

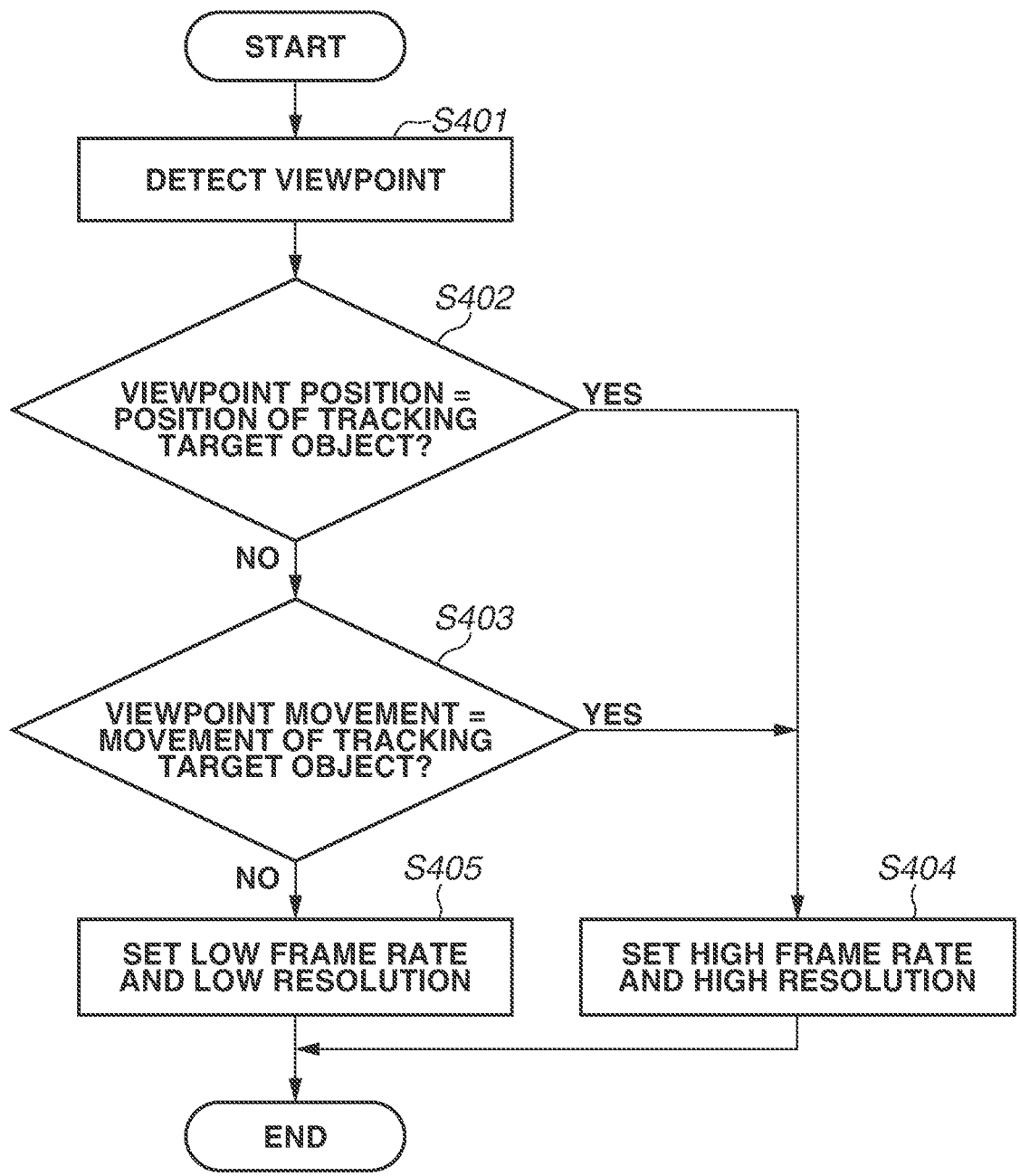

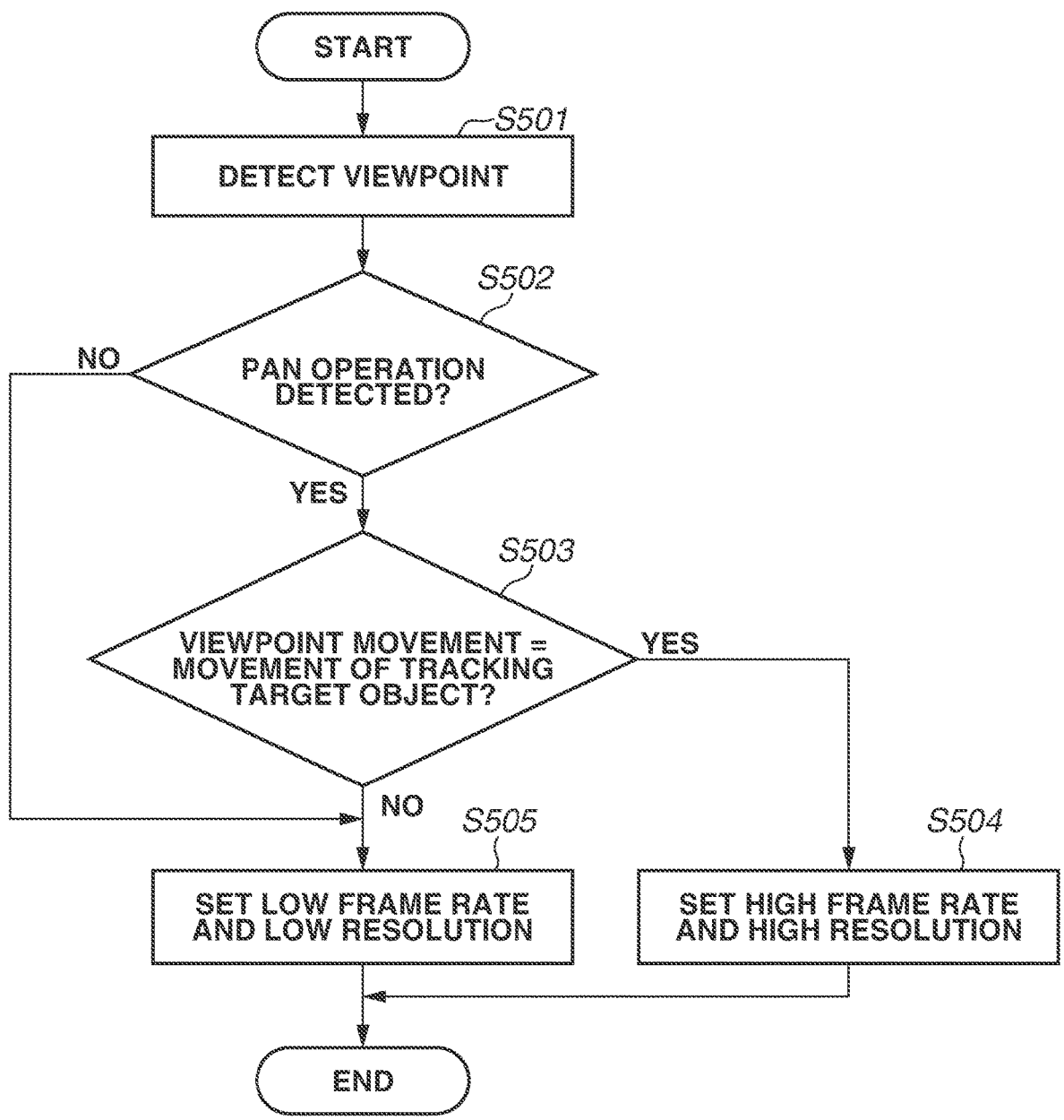

IMAGING APPARATUS HAVING VIEWPOINT DETECTION FUNCTION, METHOD OF CONTROLLING IMAGING APPARATUS, AND STORAGE MEDIUM

BACKGROUND OF THE DISCLOSURE

Field of the Disclosure

The aspect of the embodiments relates to an imaging apparatus having a viewpoint detection function, a method of controlling the imaging apparatus, and a storage medium.

Description of the Related Art

There have been discussed various technologies related to a viewpoint detection device that detects which position in the image display device such as the screen in the finder of a digital camera is observed by the user. For example, among them, technologies have been discussed of adding a function such as turning off the liquid crystal display of the display screen based on results of detection using the viewpoint detection device in a digital camera.

Japanese Patent Application Laid-Open No. 2002-189464 discusses a technology of determining whether a user is watching a display image with a viewpoint detection unit, and controlling the quality of the display image based on the result of the determination. Meanwhile, Japanese Patent Application Laid-Open No. 8-182652 discusses a technology of reducing power consumption by stopping viewpoint detection operation while a user is not looking through the eyepiece portion of an imaging apparatus.

However, in the above-described conventional technologies, the image quality of the display image is not changed while the user is watching the display image, and thus the power consumption cannot be reduced in that period. The power consumption cannot therefore be sufficiently reduced while the user is watching the display screen for a long time.

SUMMARY OF THE DISCLOSURE

According to an aspect of the embodiments, an apparatus includes an imaging unit configured to image an object to generate a captured image, a display control unit configured to display the generated captured image and additional information superimposed on the captured image on a display unit, a detection unit configured to detect a user viewpoint in the display unit, and a switching unit configured to switch a display state of the displayed captured image to a first state or a second state inferior to the first state, based on a position of the detected user viewpoint.

Further features of the disclosure will become apparent from the following description of exemplary embodiments with reference to the attached drawings.

BRIEF DESCRIPTION OF THE DRAWINGS

FIG. 3 is a flowchart illustrating an example of a processing procedure according to a first exemplary embodiment.

FIG. 4 is a flowchart illustrating an example of a processing procedure according to a second exemplary embodiment.

FIG. 5 is a flowchart illustrating an example of a processing procedure according to a third exemplary embodiment.

DESCRIPTION OF THE EMBODIMENTS

Exemplary embodiments of the disclosure will be described in detail below with reference to the attached drawings.

Figure 1:
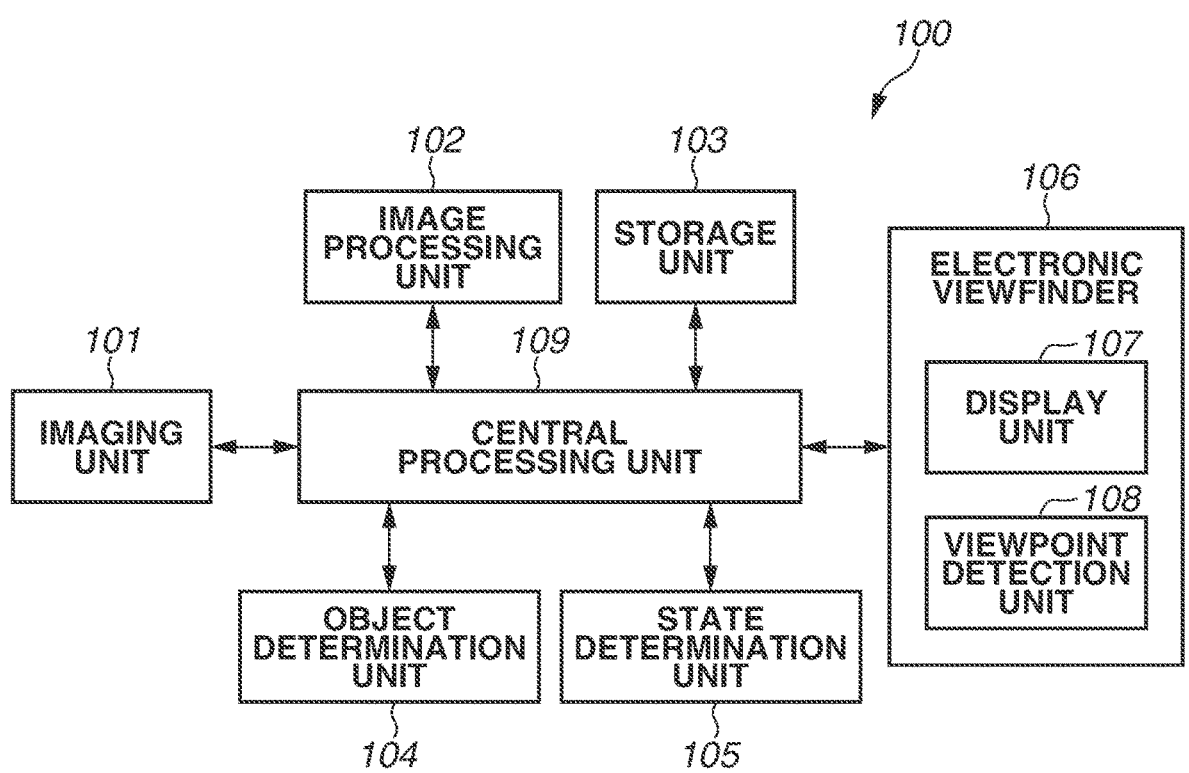
FIG. 1 is a block diagram illustrating an internal configuration example of a digital camera according to an exemplary embodiment.

FIG. 1 is a block diagram illustrating an internal configuration example of a digital camera 100 serving as an imaging apparatus according to a first exemplary embodiment.

In FIG. 1, an imaging unit 101 includes an image sensor such as a charge coupled device (CCD) sensor or a complementary metal oxide semiconductor (CMOS) sensor. The imaging unit 101 images an object and outputs the image data obtained by that imaging to an image processing unit 102.

The image processing unit 102 performs image processing such as image analysis on the image data obtained by the imaging unit 101.

A storage unit 103 is configured of a memory such as a flash memory, and stores information including information to be held even while the imaging apparatus is powered off, such as user setting information and transferred information generated each time image data is transferred. The storage unit 103 also stores programs including a program for performing device control such as imaging and an operating system (OS).

An object determination unit 104 detects one or plural objects in the image obtained by the imaging unit 101, and, with plural objects detected, determines which object to be tracked among them. Object information about the object determined by the object determination unit 104 is stored into the storage unit 103.

A state determination unit 105 periodically determines whether the digital camera 100 is panning Specifically, for example, in the determination, the state determination unit 105 uses detection signals of shake detected by a gyro sensor. Subsequently, the state determination unit 105 notifies a central processing unit (CPU) 109 of information indicating whether the digital camera 100 is panning.

An electronic viewfinder (EVF) 106 includes a display unit 107, which can display playback images and captured images, and a viewpoint detection unit 108, which detects the viewpoint of a user.

The display unit 107 can be viewed via an eyepiece portion of the EVF 106. The display unit 107 is configured of a panel such as a liquid crystal display (LCD) panel or an organic electroluminescence (EL) panel. The display unit 107 displays captured images obtained by the imaging unit 101 and subjected to image processing by the image processing unit 102, and also displays, for example, an object frame surrounding an object and information such as image-capturing information that are superimposed on the captured image.

The viewpoint detection unit 108 detects the viewpoint of the user and outputs the detection result obtained thereby to the CPU 109. The detection result obtained by the viewpoint detection unit 108 is stored into the storage unit 103 as viewpoint detection information. For example, information representing a viewpoint position and a viewpoint movement of the user is stored as the viewpoint detection information.

The CPU 109 controls each unit of the digital camera 100 to perform operations such as object detection by the object determination unit 104 and control for display on the display unit 107. The CPU 109 runs predetermined programs, thereby controlling the imaging unit 101, the image processing unit 102, the storage unit 103, the object determination unit 104, the state determination unit 105, the display unit 107, and the viewpoint detection unit 108.

Figure 2:
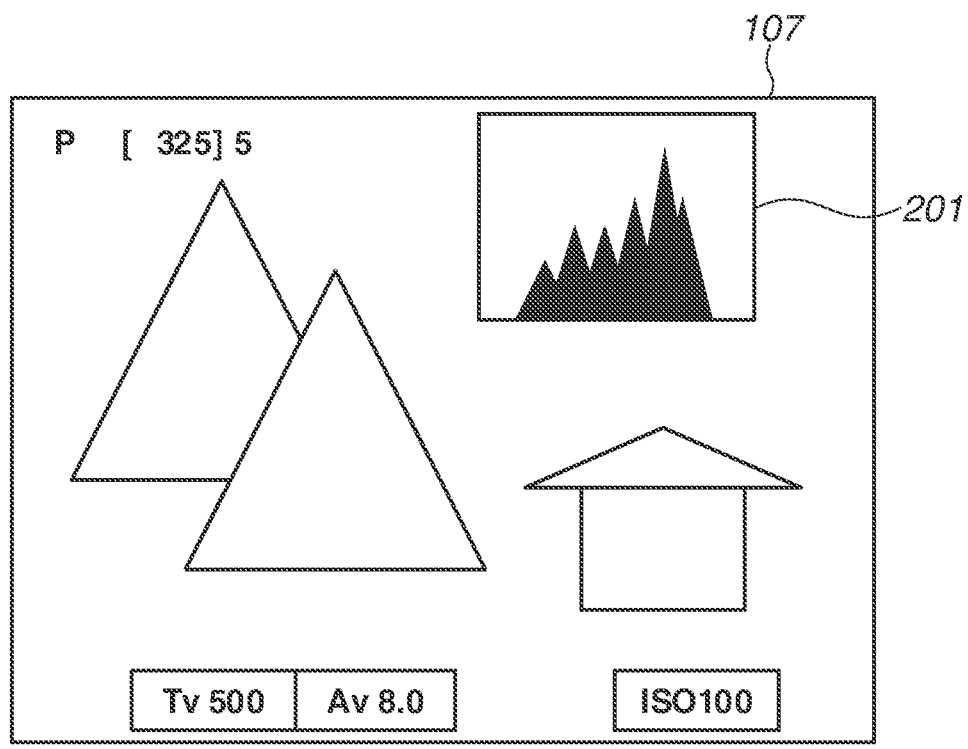
FIG. 2 is a diagram illustrating an example of an image displayed in real time.

FIG. 2 is a diagram illustrating an example of an image displayed on the display unit 107 in real time.

As illustrated in FIG. 2, a real-time captured image obtained via the imaging unit 101 is displayed on the display unit 107. Further, additional information 201 about the captured image currently displayed is superimposed on the captured image and displayed on the display unit 107. For example, a histogram representing the luminance distribution of the entire captured image being displayed is displayed as the additional information 201 superimposed and displayed.

Next, a processing procedure of switching frame rates in the present exemplary embodiment will be described with reference to a flowchart in FIG. 3. In the present exemplary embodiment, it will be described that the captured image with the superimposed additional information 201 displayed thereon is assumed to be displayed on the display unit 107 as illustrated in FIG. 2.

In FIG. 3, the processing described in the flowchart begins with the transition of the digital camera 100 to a viewpoint detection state, or the passage of a predetermined time following the transition to the viewpoint detection state. The viewpoint detection state herein refers to, for example, a state where a user is looking through the finder, i.e., a state where the viewpoint of the user can be detected, such as the time when shielding an external light sensor in the finder is detected.

In step S301, the CPU 109 controls the viewpoint detection unit 108 to detect a viewpoint position and a viewpoint movement of the user that is looking through the EVF 106 to see the display unit 107. Subsequently, the CPU 109 acquires the result of the viewpoint detection by the viewpoint detection unit 108.

In step S302, the CPU 109 determines whether the viewpoint position of the user detected in step S301 matches the position of the additional information displayed on the display unit 107. If the CPU 109 determines that the viewpoint position matches the position of the additional information (YES in step S302), the processing proceeds to step S304. Otherwise (NO in step S302), the processing proceeds to step S303.

In step S303, the CPU 109 sets a high frame rate for the captured image to be displayed on the display unit 107, and sets a high resolution as the display resolution.

In step S304, the CPU 109 sets a low frame rate for the captured image to be displayed on the display unit 107, and sets a low resolution as the display resolution.

As described above, according to the present exemplary embodiment, while the user is referring to the additional information 201 displayed on the display unit 107, the user is deemed to have no intention to capture an image. As a result, the frame rate of the image to be displayed in the digital camera 100 is lowered, thus reducing the power consumption of the digital camera 100. In the present exemplary embodiment, the example is described in which the user is watching the additional information on the display image illustrated in FIG. 2, but the present exemplary embodiment is also applicable to the case where the user is watching other information (such as an image-capturing condition).

A second exemplary embodiment will be described. The second exemplary embodiment of the disclosure will be described below with reference to FIG. 4. An internal configuration of a digital camera 100 according to the present exemplary embodiment is similar to that of the first exemplary embodiment and thus will not be described.

In the present exemplary embodiment, an example will be described in which a display state is degraded by lowering a frame rate, except for the user's viewpoint movement following a tracking target object and the user's viewpoint position matching a tracking target object. In the present exemplary embodiment, the tracking target object is determined by the object determination unit 104, and the user is deemed to have the intention to capture an image with the user's viewpoint position matching the position of the tracking target object or with the detection of the user's viewpoint movement following the tracking target object.

FIG. 4 is a flowchart illustrating an example of a processing procedure of switching a frame rate in the present exemplary embodiment. Processing similar to that in FIG. 3 will not be described. In FIG. 4, the processing described in the flowchart begins with the transition of the digital camera 100 to a viewpoint detection state, or the passage of a predetermined time following the transition to the viewpoint detection state.

In step S401, processing similar to step S301 is performed.

In step S402, the CPU 109 determines whether the viewpoint position of the user detected in step S401 matches the position of the tracking target object determined by the object determination unit 104. If the CPU 109 determines that the viewpoint position matches the position of the tracking target object (YES in step S402), it is highly likely that the user is staring at the object, and thus the processing proceeds to step S404. Otherwise (NO in step S402), the processing proceeds to step S403.

In step S403, the CPU 109 determines whether the viewpoint movement of the user detected in step S401 matches the movement of the tracking target object. For example, if the viewpoint movement of the user is drawing a trail plotted with the user's viewpoint positions as if they are following the tracking target object, the CPU 109 determines that the viewpoint movement of the user matches the movement of the tracking target object. If the CPU 109 determines that the viewpoint movement matches the movement of the tracking target object (YES in step S403), it is highly likely that the user is searching for the object, and thus the processing proceeds to step S404. Otherwise (NO in step S403), the processing proceeds to step S405.

In step S404, processing similar to step S303 is performed.

In step S405, processing similar to step S304 is performed.

As described above, according to the present exemplary embodiment, the user is deemed to have the intention to capture an image with the user's viewpoint of movement appearing to be following the tracking target object. Except for such a case, the frame rate of an image displayed in the digital camera 100 is lowered, thus reducing the power consumption of the digital camera 100. In the present exemplary embodiment, the object determined to be a tracking target by the object determination unit 104 is used for the determination of the viewpoint movement of the user. Alternatively, the present exemplary embodiment may also be applied to a case where the viewpoint movement of the user is determined to be tracking another object.

A third exemplary embodiment will be described. The third exemplary embodiment of the disclosure will be described with reference to FIG. 5. An internal configuration of a digital camera 100 according to the present exemplary embodiment is similar to that of the first exemplary embodiment, and thus will not be described.

In the present exemplary embodiment, an example will be described in which a display state is degraded by lowering a frame rate, except for the case where a user follows an image-capturing target object while panning the digital camera 100. Typically, when a user makes a panning shot, the user follows an object displayed on the display unit 107 in the EVF 106 with the viewpoint of the user, while panning the digital camera 100 as the user is looking through the EVF 106. For example, for the user to track an object in panning, a higher frame rate of the image displayed on the display unit 107 is to be set so that the user may keep track of the position of the object.

Meanwhile, with the digital camera 100 being panned to merely change the orientation of the digital camera 100 for the user to find an object, the frame rate of an image displayed on the display unit 107 may be low. In addition, while the user panning the digital camera 100 is looking through the EVF 106 without following any specific object with the user's viewpoint, the frame rate of an image displayed on the display unit 107 may also be low. In this case, the user can be deemed to be merely panning the digital camera 100 without recording an image file.

FIG. 5 is a flowchart illustrating an example of a processing procedure of switching a frame rate in the present exemplary embodiment. Processing similar to that in FIG. 3 will not be described. In FIG. 5, the processing described in the flowchart begins with the transition of the digital camera 100 to a viewpoint detection state, or the passage of a predetermined time following the transition to the viewpoint detection state.

In step S501, processing similar to step S301 is performed.

In step S502, the CPU 109 determines whether panning is detected by the state determination unit 105. If the CPU 109 determines that panning is not detected (NO in step S502), the processing proceeds to step S505. If the CPU 109 determines that panning is detected (YES in step S502), the processing proceeds to step S503.

In step S503, the CPU 109 performs processing similar to step S403 while the user is panning the digital camera 100. In the present exemplary embodiment, if the viewpoint movement of the user detected in step S501 matches the movement of a tracking target object determined by the object determination unit 104, the user is deemed to be panning. If the CPU 109 determines that the viewpoint movement of the user matches the movement of the tracking target object (YES in step S503), the processing proceeds to step S504. Otherwise (NO in step S503), it is highly likely that the user is panning the digital camera 100 with no intention of capturing an image, and thus the processing proceeds to step S505.

In step S504, processing similar to step S303 is performed.

In step S505, processing similar to step S304 is performed.

As described above, according to the present exemplary embodiment, if the user follows the image-capturing target (tracking target) object while panning the digital camera 100, the user is deemed to be panning with the intention to capture an image. Except for the case where the viewpoint movement of the user follows the tracking target object while the user is panning the digital camera 100, the frame rate of an image displayed in the digital camera 100 therefore is lowered, reducing the power consumption of the digital camera 100. Lowering the frame rate of an image displayed when the user is panning without no intention to capture the image enables reduction in the power consumption of the digital camera 100. In the present exemplary embodiment, the frame rate of the image displayed is switched based on the case where the user follows the image-capturing target object while panning the digital camera 100. The present exemplary embodiment however is not limited to this method. For example, the present exemplary embodiment is also applicable to the case where an object is tracked by another operation such as tilt operation.

Other Exemplary Embodiments

In the above-described exemplary embodiments, the digital camera is used as the imaging apparatus to which the disclosure is applied, but the disclosure is not limited to such a specific example. The disclosure is generally applicable to the apparatus having the above-described functions.

The disclosure can also be implemented by the processing of a program for implementing one or more functions in the above-described exemplary embodiments being supplied to a system or apparatus via a network or a storage medium and one or more processors in a computer of the system or apparatus reading and executing the program. The disclosure can also be implemented by a circuit that implements one or more functions (for example, an application specific integrated circuit (ASIC)).

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-083750, filed May 12, 2020, which is hereby incorporated by reference herein in its entirety.

What is claimed is:

1. An apparatus comprising:
   an imaging unit configured to image an object to generate a captured image;
   a display control unit configured to display the captured image on a display unit;
   a viewpoint detection unit configured to detect a user viewpoint in the displayed captured image;
   an object detection unit configured to detect movement of an object to be a tracking target in the captured image; and
   a switching unit configured to switch a display state of the displayed captured image displayed to a first state or a second state inferior to the first state, based on the detected user viewpoint and the detected object,
   wherein the switching unit switches the display state to the second state, in response to a position of the detected user viewpoint not matching a position of the detected object and to a movement of the detected user viewpoint not following the detected object.

2. The apparatus according to claim 1, further comprising a determination unit configured to determine a state of the apparatus,
   wherein the switching unit switches the display state to the second state, in response to a predetermined operation of the apparatus being detected by the determination unit and to the movement of the detected user viewpoint not following the detected object.

3. The apparatus according to claim 1, wherein the display state is a state related to a frame rate, and a frame rate in the second state is lower than a frame rate in the first state.

4. The apparatus according to claim 1, wherein the display state is a state related to a resolution, and a resolution in the second state is lower than a resolution in the first state.

5. A method of controlling an apparatus including an imaging unit configured to image an object to generate a captured image, the method comprising:
   controlling display to display the generated captured image on a display unit;
   detecting a user viewpoint in the displayed captured image;
   detecting movement of an object to be a tracking target in the captured image; and
   switching a display state of the displayed captured image nit to a first state or a second state inferior to the first state, based on the detected user viewpoint and the object detected by the detecting,
   wherein the switching switches the display state to the second state, in response to a position of the detected user viewpoint not matching a position of the detected object and to a movement of the detected user viewpoint not following the detected object.

6. The method according to claim 5, further comprising determining a state of the apparatus,
   wherein the switching switches the display state to the second state, in response to a predetermined operation of the apparatus being detected by the determining and to the movement of the detected user viewpoint not following the detected object.

7. The method according to claim 5, wherein the display state is a state related to a frame rate, and a frame rate in the second state is lower than a frame rate in the first state.

8. The method according to claim 5, wherein the display state is a state related to a resolution, and a resolution in the second state is lower than a resolution in the first state.

9. A non-transitory computer-readable storage medium storing a program for causing a computer to execute a method, the method comprising:
   controlling display to display a generated captured image on a display unit;
   detecting a user viewpoint in the displayed captured image;
   detecting movement of an object to be a tracking target in the captured image; and
   switching a display state of the displayed captured image unit to a first state or a second state inferior to the first state, based on the detected user viewpoint and the object detected by the detecting,
   wherein the switching switches the display state to the second state, in response to a position of the detected user viewpoint not matching a position of the detected object and to a movement of the detected user viewpoint not following the detected object.

10. The non-transitory computer-readable storage medium according to claim 9, wherein the switching switches the display state to the second state, when the position of the detected user viewpoint is the additional information.

11. The non-transitory computer-readable storage medium according to claim 9, wherein the display state is a state related to a frame rate, and a frame rate in the second state is lower than a frame rate in the first state.

12. The non-transitory computer-readable storage medium according to claim 9, wherein the display state is a state related to a resolution, and a resolution in the second state is lower than a resolution in the first state.

* * * * *